Sept. 22, 1925.

J. D. KARLE

SHAFT COUPLING

Filed Dec. 12, 1921

WITNESSES:
Godfrey Picina
John F. Heing

INVENTOR
John D. Karle
BY
Henry J Miller
ATTORNEY

Patented Sept. 22, 1925.

1,554,733

UNITED STATES PATENT OFFICE.

JOHN D. KARLE, OF ROSELLE PARK, NEW JERSEY, ASSIGNOR TO THE SINGER MANUFACTURING COMPANY, OF ELIZABETH, NEW JERSEY, A CORPORATION OF NEW JERSEY.

SHAFT COUPLING.

Application filed December 12, 1921. Serial No. 521,584.

*To all whom it may concern:*

Be it known that I, JOHN D. KARLE, a citizen of the United States, residing at Roselle Park, in the county of Union and State of New Jersey, have invented certain new and useful Improvements in Shaft Couplings, of which the following is a specification, reference being had therein to the accompanying drawings.

This invention relates to safety shaft-couplings and has for an object to provide a simplified and improved shaft-coupling which may be manufactured at low cost and which may be quickly and easily applied to or removed from the shaft-sections as a unit without danger of losing or displacing any of the component parts.

The invention, as embodied specifically in a coupling for abutted shaft-sections, comprises a cylindical body-member having a central or primary aperture adapted to receive the shaft-sections. The body-member is further formed at each end with a secondary aperture disposed alongside and lengthwise of the primary shaft-aperture. The inner ends of these secondary apertures are preferably reduced in size to receive and support the inner ends of respective clutch-roll bearing studs which extend lengthwise of and within the respective secondary apertures. Each of the bearing studs supports a cylindrical clutch-roll adapted to engage a respective shaft-section; each clutch-roll having an eccentric bearing aperture freely fitting its supporting stud. The outer end of each bearing stud is supported by the cylindrical body-member, preferably by being bushed to the size of the outer end of the respective secondary aperture.

Figure 1:
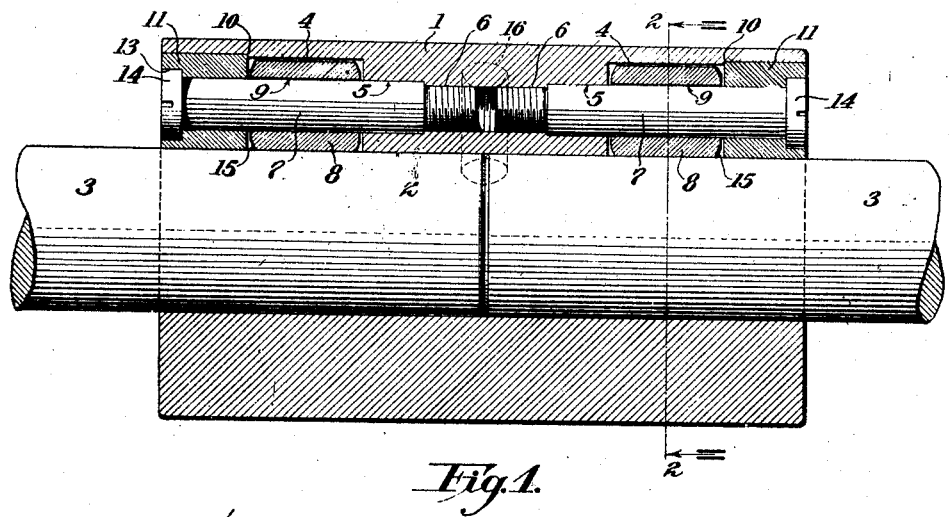
Figure 2:
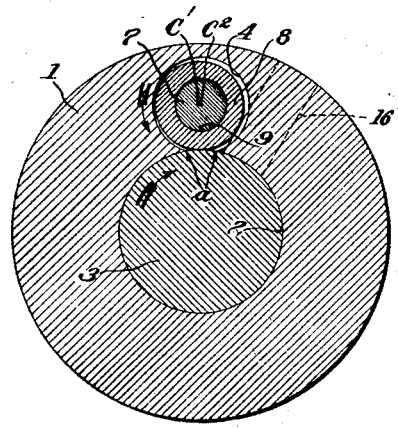
Figure 3:
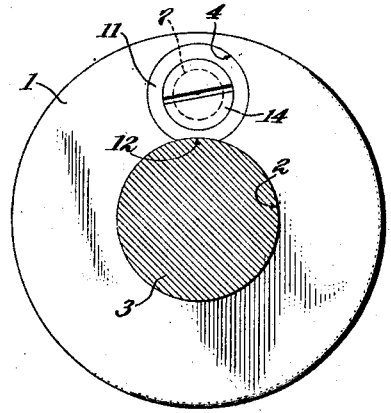
Figure 4:
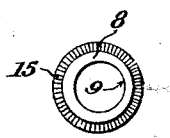
Figure 5:
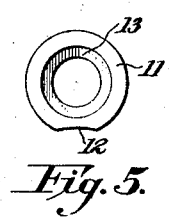

In the accompanying drawings, Fig. 1 is a longitudinal section through a shaft-coupling embodying the invention. Fig. 2 is a section on the line 2—2, Fig. 1. Fig. 3 is an end view of the device. Fig. 4 is an end view of a clutch-roll such as shown in section in Fig. 2. Fig. 5 is an end view of a bushing element such as is used to support the outer end of each clutch-roll bearing pin, and Fig. 6 is a detail view of a clutch-roll and certain associated parts.

In the particular embodiment of the invention chosen for the purposes of the present disclosure 1 represents the cylindrical body-member of the coupling which is formed with a central primary aperture 2 to receive the abutted shaft-sections 3, 3 and with secondary apertures 4, 4 having their inner ends reduced in size at 5, 5 and threaded at 6, 6 to receive and support the inner threaded ends of the bearing studs 7, 7. To facilitate machining operations in the manufacture of the device, the centers of the apertures 4, 4 are preferably in alinement; the inner reduced ends 5, 5 of the apertures 4, 4 opening into one another to form one continuous aperture. The centers of the apertures 2 and 4 are preferably spaced apart a distance slightly less than the sum of the radii of such apertures in order that the latter will be merged together or open into one another along the narrow longitudinal zone *a*, Fig. 2.

The secondary apertures 4, 4 constitute clearance chambers for the clutch-rolls 8, 8 which are eccentrically pivoted, preferably by being formed each with an eccentric aperture 9, Fig. 4, slightly larger in diameter than the respective supporting stud 7. The eccentricity of the aperture 9 is preferably small or of the order of approximately 2% of the diameter of the clutch-roll 8. Such eccentricity may be increased or diminished to meet any particular set of conditions which may arise in practice; but preferably should not be so great as to allow the coupling to unlock easily when subjected to a sudden jar.

Figure 6:
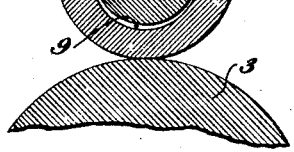

The diameter of each clutch-roll 8 is preferably such that its outer surface will engage the shaft 2 when its supporting stud 7 is above such shaft and when the roll is so turned that its thinnest wall portion is nearest the shaft, as shown in Fig. 6. The clutch-roll diameter may be made slightly larger than this figure to insure that the shaft 3 will take the weight of the clutch-roll off of its supporting stud and thus cause the clutch-roll to turn freely to locking position, Fig. 2, by rolling upon the shaft-section when the latter is turned relative to the body 1.

The outer ends of the apertures 4, 4 are slightly enlarged to form shoulders 10, 10 and admit the bushings 11, 11 which are preferably used to fill the space between the outer ends of the respective bearing studs 7 and the walls of the respective apertures 4. When a bushing 11 is used it should be cut away as at 12 to clear the shaft 3 and should preferably be recessed as at 13 to receive the head 14 of the bearing stud 7. It will be observed that the stud 7 and clutch-roll 8, as well as the bushing 11, may be assembled apart from the body-member 1 and then readily inserted in the aperture 4 as a unitary assembly.

The clutch-rolls are preferably knurled at their outer ends, as indicated at 15, so that in case insertion of a shaft-section in the aperture 2 is impeded by a roll 8, the shaft 3 and body 1 may be relatively turned and thus cause the roll 8 to turn sufficiently to allow the shaft to enter. After the shaft has been slipped past the respective clutch-roll, a slight relative turning movement of the shaft and body 1 in either direction will lock the two together in driving relation.

In the embodiment of the invention illustrated the studs 7 act to sustain the side thrust of the clutch-rolls 8 caused by the wedging action of the variable thickness ring-like walls of the clutch-rolls between such studs and the shaft sections 3.

The clearance between a roll 8 and its supporting stud 7 permits the roll to touch and rest upon shaft sections varying in diameter within the limits of such clearance. Extreme accuracy in manufacture is therefore not required.

The body 1 may be formed with a radial aperture 16 to admit a wrench or pin for forcibly turning the body 1 relative to a shaft-section to lock or unlock the coupling device relative to such shaft-section.

Little difficulty will be encountered in practice in securing a grip between a shaft-section and the body of the coupling, particularly if care is taken to turn the body 1 so that the clutch-rolls will be positioned above the shaft-sections and rotated by the latter to locking position.

The invention is, of course, not limited to its use for coupling abutted shaft-sections, but may be used for coupling a shaft-section to a hollow or apertured member of any of the various types commonly used in machinery.

Having thus set forth the nature of the invention, what I claim herein is—

1. In a coupling device, a member having a shaft aperture adapted to receive a shaft-section and also having a recess adjacent and in communication with said shaft aperture, and a cylindrical clutch-roll eccentrically journaled within said recess and adapted to engage said shaft, one end face of said clutch-roll being knurled, as and for the purpose specified.

2. In a coupling device, a one-piece body-member having a shaft aperture and a clutch-roll chamber disposed alongside of said aperture and entirely enclosed within the outer surface of said body-member, and a cylindrical clutch-roll eccentrically journaled within said chamber, one end face of said clutch-roll being knurled, as and for the purpose specified.

3. In a coupling device, a body-member having a shaft aperture and an open-ended clutch-roll chamber alongside of said aperture, a bearing stud passing through said clutch-roll chamber, and a cylindrical clutch-roll eccentrically journaled on said bearing stud, said clutch-roll and stud being removable from and replaceable in said chamber as a unitary assembly through the open end of said chamber.

4. In a coupling device, a member having a primary aperture adapted to receive a shaft-section and a secondary aperture alongside of said primary aperture, said apertures openings into one another, a bearing stud disposed in said secondary aperture, a clutch-roll journaled eccentrically on said bearing stud and adapted to engage said shaft, and a bushing fitted to said secondary aperture for supporting the outer end of said bearing stud.

5. In a coupling device, a member having a primary aperture adapted to receive a shaft-section and a secondary aperture substantially parallel to said primary aperture, the centers of said apertures being spaced apart a distance less than the sum of the radii of said apertures and the inner end of the secondary aperture being reduced in size, a bearing stud disposed within said secondary aperture and supported at its inner end by the wall of the reduced end of said secondary aperture, a bushing fitting said bearing stud and said secondary aperture and adapted to support the outer end of said bearing stud, and a clutch-roll journaled eccentrically on and intermediate the ends of said bearing stud and adapted to engage said shaft-section to couple it to said member.

6. In a coupling device, a cylindrical body-member having a shaft aperture adapted to receive abutted shaft-sections, and a second aperture alongside of an parallel to said shaft aperture, said second aperture having its opposite ends enlarged to form clutch-roll clearance chambers merging into said shaft aperture, bearing studs disposed within said chambers and supported at their inner ends by the central portion of said second aperture, clutch-rolls journaled eccentrically on said bearing studs, and means for supporting the outer ends of said bearing studs against bending strains.

In testimony whereof, I have signed my name to this specification.

JOHN D. KARLE.